US009610691B2

(12) United States Patent
Noh et al.

(10) Patent No.: US 9,610,691 B2
(45) Date of Patent: Apr. 4, 2017

(54) ROBOT CLEANER AND METHOD FOR CONTROLLING THE SAME

(71) Applicant: LG ELECTRONICS INC., Seoul (KR)

(72) Inventors: Dongki Noh, Seoul (KR); Seungmin Baek, Seoul (KR); Kwangho An, Seoul (KR); Yeonsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/881,738

(22) Filed: Oct. 13, 2015

(65) Prior Publication Data

US 2016/0101524 A1   Apr. 14, 2016

(30) Foreign Application Priority Data

Oct. 10, 2014   (KR) .................. 10-2014-0136768

(51) Int. Cl.
*G06K 9/00* (2006.01)
*B25J 9/16* (2006.01)
(Continued)

(52) U.S. Cl.
CPC ........... *B25J 9/1697* (2013.01); *B25J 9/1676* (2013.01); *B25J 11/0085* (2013.01);
(Continued)

(58) Field of Classification Search
CPC ............. A47L 2201/04; A47L 2201/00; A47L 2201/06
(Continued)

(56) References Cited

U.S. PATENT DOCUMENTS 6,868,307 B2 * 3/2005 Song .................. A47L 9/009
318/568.1
7,031,805 B2 * 4/2006 Lee .................. B60L 11/1833
700/245
(Continued)

FOREIGN PATENT DOCUMENTS

EP   2 677 386     12/2013
JP   3178529 B2    6/2001
(Continued)

OTHER PUBLICATIONS

Korean Notice of Allowance dated Feb. 29, 2016 issued in Application No. 10-2014-0136768.
(Continued)

*Primary Examiner* — Yosef Kassa
(74) *Attorney, Agent, or Firm* — KED & Associates, LLP

(57) ABSTRACT

A robot cleaner and a control method thereof according to the present disclosure select a seed pixel in an image of an area in front of a main body, obtain a brightness difference between an upper region and a lower region obtained by dividing a predetermined detection area including each of neighboring pixels of the seed pixel and select a pixel belonging to a detection area having a largest brightness difference as a pixel constituting the boundary between objects indicated in the image. Accordingly, the boundary between objects present within a cleaning area can be detected rapidly and correctly through an image.

16 Claims, 12 Drawing Sheets

(51) Int. Cl.
*G05D 1/02* (2006.01)
*G06K 9/48* (2006.01)
*B25J 11/00* (2006.01)
*G06T 7/00* (2017.01)
*G06T 7/40* (2017.01)
*G06K 9/20* (2006.01)

(52) U.S. Cl.
CPC ....... *G05D 1/0246* (2013.01); *G06K 9/00664* (2013.01); *G06K 9/2036* (2013.01); *G06K 9/48* (2013.01); *G06T 7/0044* (2013.01); *G06T 7/0081* (2013.01); *G06T 7/408* (2013.01); *G05D 2201/0215* (2013.01); *G06T 2207/20021* (2013.01); *Y10S 901/01* (2013.01)

(58) Field of Classification Search
USPC ....... 382/103, 153, 170, 171, 190, 209, 224, 382/278, 286; 348/113, 116, 118; 700/245, 248
See application file for complete search history.

(56) References Cited

U.S. PATENT DOCUMENTS

| | | | | |
|---|---|---|---|---|
| 7,480,958 | B2* | 1/2009 | Song | A47L 9/009 15/319 |
| 8,195,331 | B2* | 6/2012 | Myeong | G05D 1/0274 134/18 |
| 8,387,193 | B2* | 3/2013 | Ziegler | A47L 5/14 15/319 |
| 8,430,221 | B2* | 4/2013 | Kuehl | F16D 11/10 192/114 R |
| 8,670,866 | B2* | 3/2014 | Ziegler | A47L 5/14 123/350 |
| 2005/0190969 | A1 | 9/2005 | Cathier et al. | |

FOREIGN PATENT DOCUMENTS

| | | |
|---|---|---|
| JP | 3781217 B2 | 5/2006 |
| KR | 10-2007-0085120 A | 8/2007 |
| KR | 10-2014-0042494 | 4/2014 |
| WO | WO 2013/083972 | 6/2013 |

OTHER PUBLICATIONS

Natonek, Emerico: "Fast Range Image Segmentation for Servicing Robots"; Proceedings of the 1998 IEEE International Conference on Robotics and Automation; May 16-20, 1998; Katholie Ke Universiteit Leuven, Leuven, Belgium; New York, NY; vol. 1; May 16, 1998; pp. 406-411 (XP010281124).

Lee, Chia-Hsiang et al.: "An Intelligent Depth-Based Obstacle Detection System for Visually-Impaired Aid Applications "; IEEE 13th International Workshop on Image Analysis for Multimedia Interactive Services (WIAMIS); May 23, 2012; pp. 1-4 (XP032195807).

European Search Report dated Mar. 1, 2016 issued in Application No. 15188923.5.

\* cited by examiner

Mask(9x9)

ROBOT CLEANER AND METHOD FOR CONTROLLING THE SAME

CROSS-REFERENCE TO RELATED APPLICATION

This application claims priority under 35 U.S.C. §119 to Korean Patent Application No. 10-2014-0136768, filed on Oct. 10, 2014 in the Korean Intellectual Property Office, whose entire disclosure is hereby incorporated by reference.

BACKGROUND

1. Field

The present disclosure relates to a robot cleaner and a method for controlling the same.

2. Background

A robot has been developed for industrial purposes and served as part of factory automation. With the recent extension of robot application fields, e.g., medical robots, space and aircraft robots, etc., home robots are being developed and manufactured. A robot which can autonomously move is called a mobile robot.

A typical example of home mobile robots is a robot cleaner. The robot cleaner is a type of home appliance, which sucks in dust or particles while moving about an area to be cleaned. Such robot cleaner is provided with a camera which captures an image of an area in front of the main body of the robot cleaner such that the robot cleaner recognizes the environment of the cleaning area by analyzing images obtained from the camera.

Important information that needs to be detected from an acquired image may include the boundary between objects included in the acquired image. The objects may include the floor, walls, obstacles located on the floor, etc. Since the boundary between the floor and a wall, the boundary between the floor and an obstacle and the like obstruct movement of the robot cleaner, such boundaries need to be detected through an image for correct movement of the robot cleaner. Accordingly, it is necessary to devise a method for detecting such boundaries through an image.

BRIEF DESCRIPTION OF THE DRAWINGS

The embodiments will be described in detail with reference to the following drawings in which like reference numerals refer to like elements wherein.

DETAILED DESCRIPTION

Figure 1:
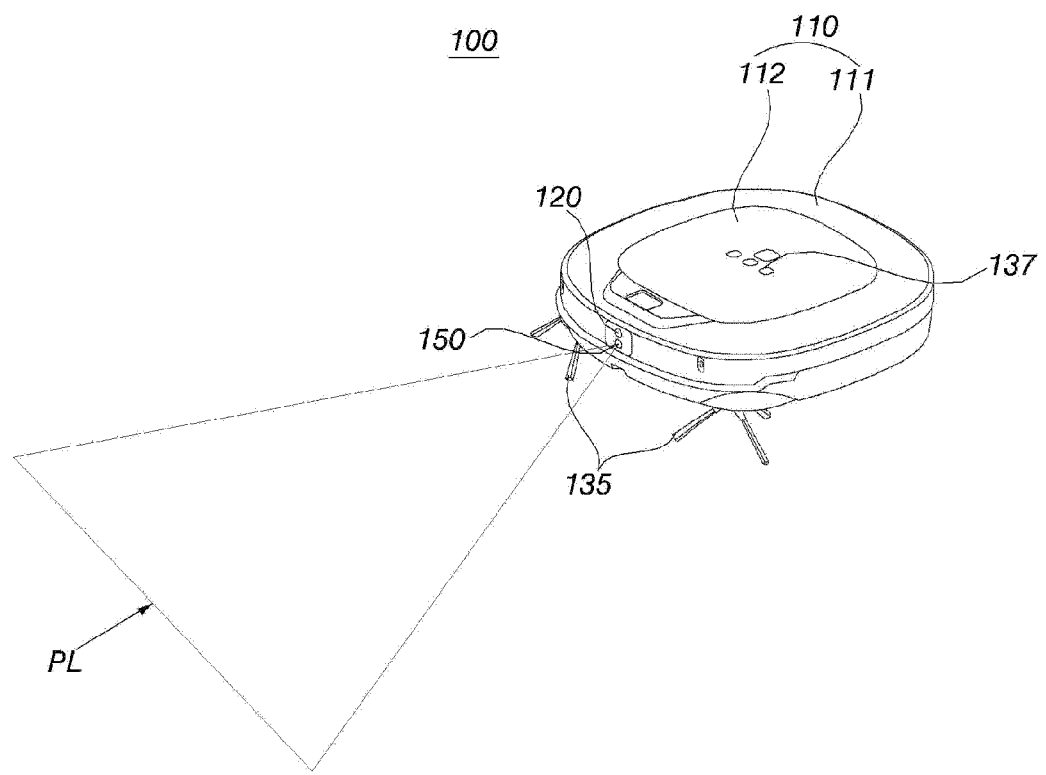
FIG. 1 is a perspective view of a robot cleaner according to an embodiment of the present disclosure.
Figure 2:
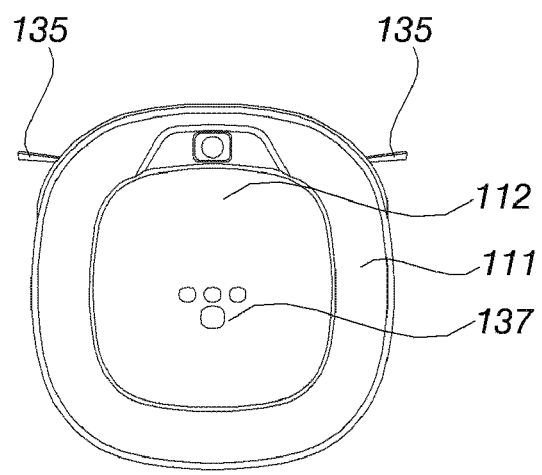
FIG. 2 is a top view of the robot cleaner shown in FIG. 1.
Figure 3:
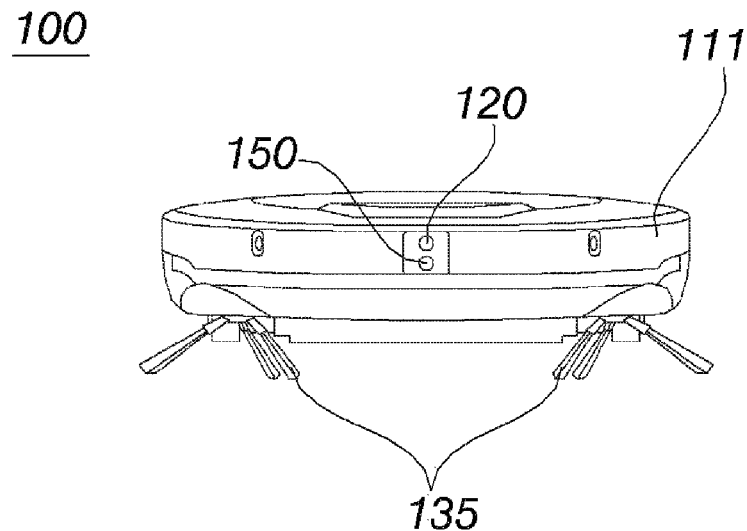
FIG. 3 is a front view of the robot cleaner shown in FIG. 1.
Figure 4:
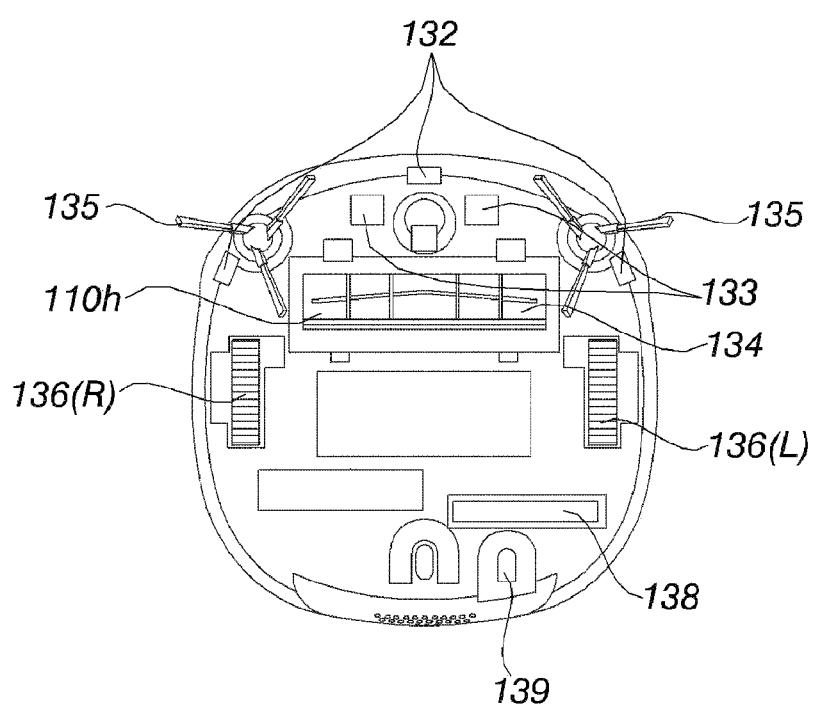
FIG. 4 is a bottom view of the robot cleaner shown in FIG. 1.
Figure 5:
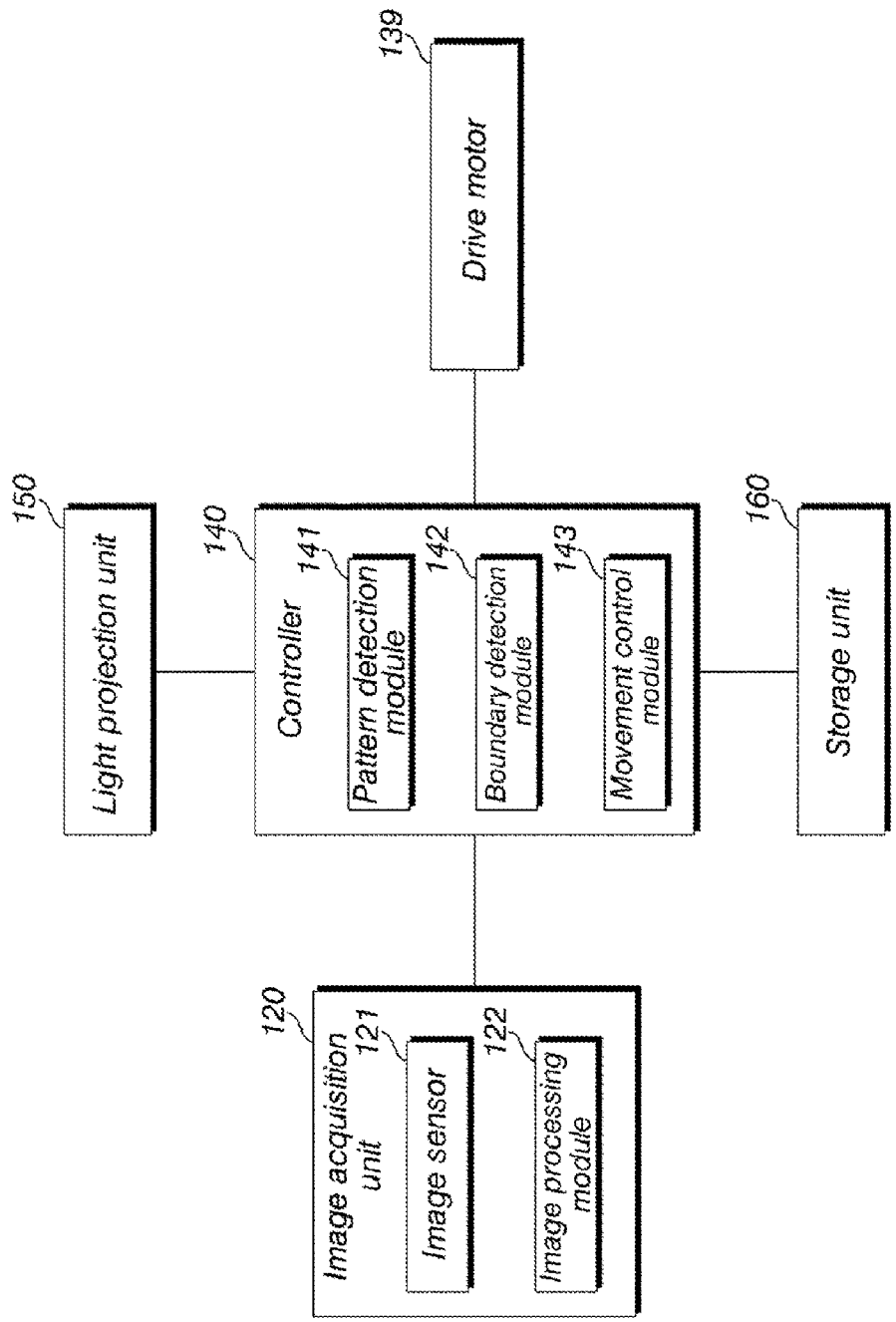
FIG. 5 is a block diagram illustrating a control relationship between main parts of the robot cleaner.
Figure 6:
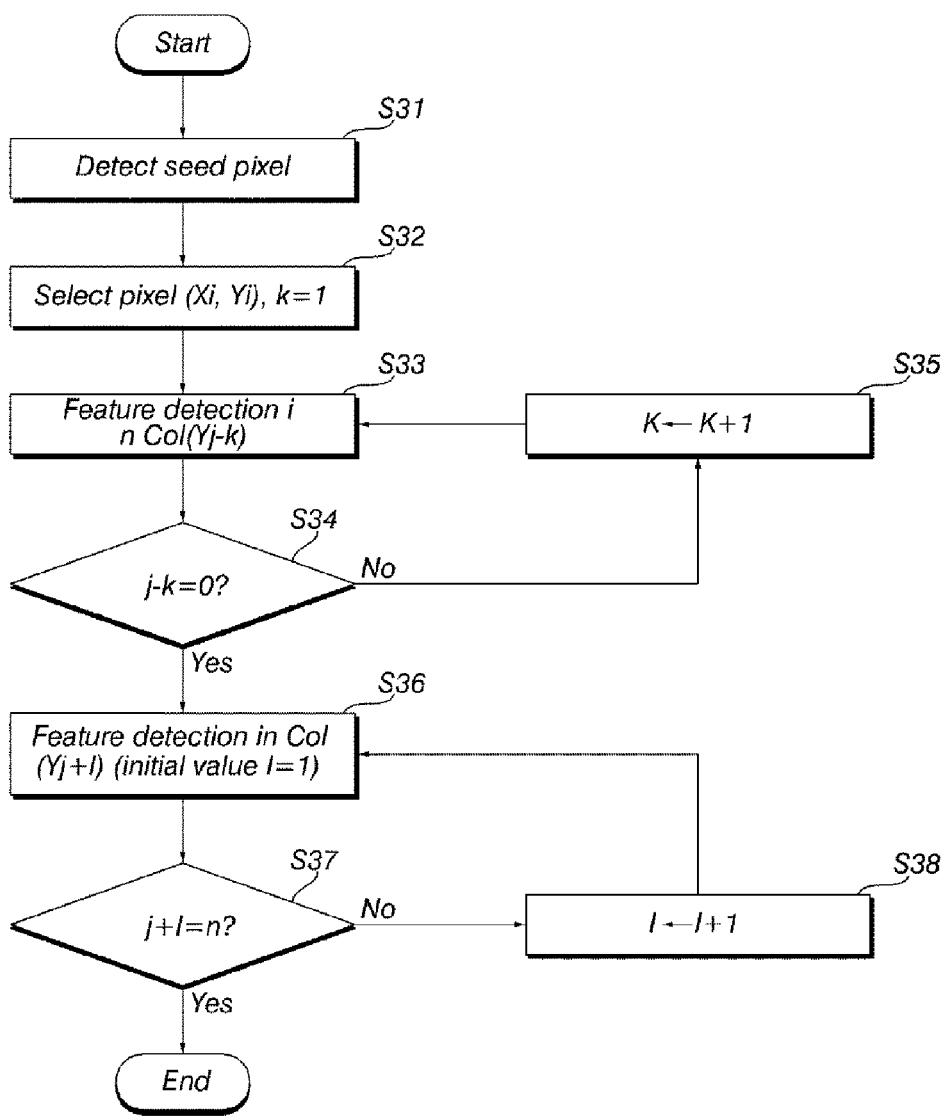
FIG. 6 is a flowchart illustrating a method for controlling the robot cleaner according to an embodiment of the present disclosure.

Referring to FIGS. 1 to 5, a robot cleaner 100 may include a main body 110 and an image acquisition unit 120, e.g., a camera, for acquiring an image around the main body 110. A part of the main body 110, which faces the ceiling of a cleaning area, is defined as an upper surface part (refer to FIG. 2 or upper), a part facing the floor of the cleaning area is defined as a lower surface part (refer to FIG. 4 or lower), and a part facing a moving direction, from among parts forming the circumference of the main body 110 between the upper surface part and the lower surface part, is defined as a front part (refer to FIG. 3 or front).

The robot cleaner 100 may include at least one wheel 136 for moving the main body 110, and the wheel 136 is driven by a drive motor 139. The wheel 136 can be provided to the left and right sides of the main body 110, which are respectively called a left wheel 136(L) and a right wheel 136(R).

While the left wheel 136(L) and the right wheel 136(R) can be driven by one drive motor, a separate left wheel drive motor for driving the left wheel 136(L) and a separate right wheel drive motor for driving the right wheel 136(R) may be provided, if needed. The moving direction of the main body 110 can be changed to the left or right by making rotating speeds of the left wheel 136(L) and the right wheel 136(R) differ from each other.

The main body 110 may include a case 111 forming a space for accommodating components of the robot cleaner 100. The lower surface part of the main body 110 may have an inlet 110h for air intake. The main body 110 may include a suction device or a suction motor for providing power for sucking in air through the inlet 110h and a dust container for collecting dust contained in the air sucked through the inlet 110h. The case 111 may have an opening through which the dust container is inserted into or separated from the main body 110, and a dust container cover 112 for opening/closing the opening may be rotatably provided to the case 111.

The robot cleaner 100 may include a roll type or roller main brush 134 having brushes exposed through the inlet 110h and auxiliary brushes 135 provided to the front of the lower surface part and composed of a plurality of radially extended blades. Dust is removed from the floor within the cleaning area according to rotation of the brushes 134 and 135, sucked through the inlet 110h and collected in the dust container.

A battery 138 supplies power necessary for operation of the robot cleaner 100 as well as the drive motor. When the battery 138 is discharged, the robot cleaner 100 may return to a charging stand for charging. When retuning to the charging stand, the robot cleaner 100 can detect the location of the charging stand.

A light projector or projection unit 150 projects light in a predetermined pattern (referred to as "patterned light" hereinafter) to the cleaning area. The light projection unit 150 may include a light source and an optical pattern projection element (OPPE). Light emitted from the light source generates the patterned light by passing through the OPPE. The light source may be a laser diode (LD), a light emitting diode (LED) and the like. A laser beam enables accurate distance measurement due to monochromaticity, collimation and focusing characteristics superior to other light sources. Infrared or visible light has large distance measurement accuracy variation depending on factors such as the color and material of a target. Accordingly, the light source is likely a laser diode. The OPPE may include a lens and a diffractive optical element (DOE).

The light projection unit 150 may project light toward the floor in front of the main body 110. The pattern of the light projected from the light projection unit 150 is not limited to a specific pattern and preferably includes the horizontal line. While a pattern including the horizontal line PL is exemplified in the present embodiment, a cross-shaped pattern further including a vertical line perpendicular to the horizontal line PL may be used.

The image acquisition unit 120 acquires an image by photographing an area to which the patterned light is projected. The image acquired by the image acquisition unit 120 may be referred to as an acquired image. The image acquisition unit 120 may include a digital camera which converts an image of an object into an electrical signal, changes the electrical signal into a digital signal and stores the digital signal in a memory element or storage medium. The digital camera may include an image sensor 121 and an image processing module 122.

The image sensor 121, which is a device for converting an optical image into an electrical signal, is configured in the form of a chip in which a plurality of photodiodes is integrated. The photodiodes may correspond to pixels. Charges are accumulated in the pixels according to an image formed in the chip by light that has passed through the lens, and the charges accumulated in the pixels are converted into an electrical signal (e.g. voltage). Examples of the image sensor 121 include a charge coupled device (CCD), a complementary metal oxide semiconductor (CMOS) and the like.

The image processing module 122 generates a digital image on the basis of an analog signal output from the image sensor 121. The image processing module 122 may include an AD converter for converting the analog signal into a digital signal, a buffer memory for temporarily storing digital data according to the digital signal output from the AD converter, and a digital signal processor (DSP) for generating a digital image by processing information stored in the buffer memory.

A storage unit or memory 160 stores information to control the robot cleaner and may include a volatile or non-volatile recording medium. The recording medium stores data readable by a microprocessor and may include a hard disk drive (HDD), a solid state disk (SSD), a silicon disk drive (SDD), a ROM, a RAM, a CD-ROM, a magnetic tape, a floppy disk, an optical data storage device and the like.

A controller 140 performs feature detection on predetermined pixels in an image (acquired image) obtained by the image acquisition unit 120 so as to detect a segment formed by consecutive feature pixels according to a feature detection result. The controller 140 may include a pattern detection module 141 for detecting a light pattern (generated according to patterned light projected by the light projection unit 150) indicated on the acquired image, a boundary detection module 142 for detecting the boundary between an obstacle and the floor of the cleaning area and/or the boundary between the floor and a wall, and a movement control module 143 for controlling the drive motor 139. In addition, the controller 140 can control operations of the respective components of the robot cleaner 100.

Referring to FIGS. 6 to 10, the method for controlling the robot cleaner according to an embodiment of the present disclosure includes a boundary detection step S30 for detecting a boundary (e.g., the boundary between the floor and a wall or the boundary between the floor and an obstacle). A boundary in an acquired image is formed at points where two different objects meet. The two objects generally have contrasting brightnesses on the basis of the boundary. While the brightnesses of the two objects are affected by various factors such as location of lighting, reflection of light, and the materials or colors of the objects, a brightness difference is present between the two objects which form a boundary under the common conditions.

From among boundaries between objects included in the acquired image, the boundary between the floor and a wall (e.g., FIG. 7) and the boundary between the floor and an obstacle can be considered to be important for control of traveling of the robot cleaner 100. Since such a boundary is formed between two objects arranged in vertical direction, brightnesses of the upper region and the lower region on the basis of the boundary are contrasted when pixels forming the boundary are selected and brightness distribution in a specific region around the selected pixels is observed.

To detect the pixels forming the boundary on the basis of brightness contrast between the regions, a mask in an appropriate form considering the pattern of the boundary to be detected is needed. The mask may be defined as an upper region and a lower region, which are obtained by dividing an area in an a×b matrix form including pixels corresponding to a feature detection target, and indices having different signs may be assigned to a brightness value of a pixel belonging to the upper region and a brightness value of a pixel belonging to the lower region. An index assigned to the upper region and an index assigned to the lower region may have the same size while having different signs.

Figure 9:
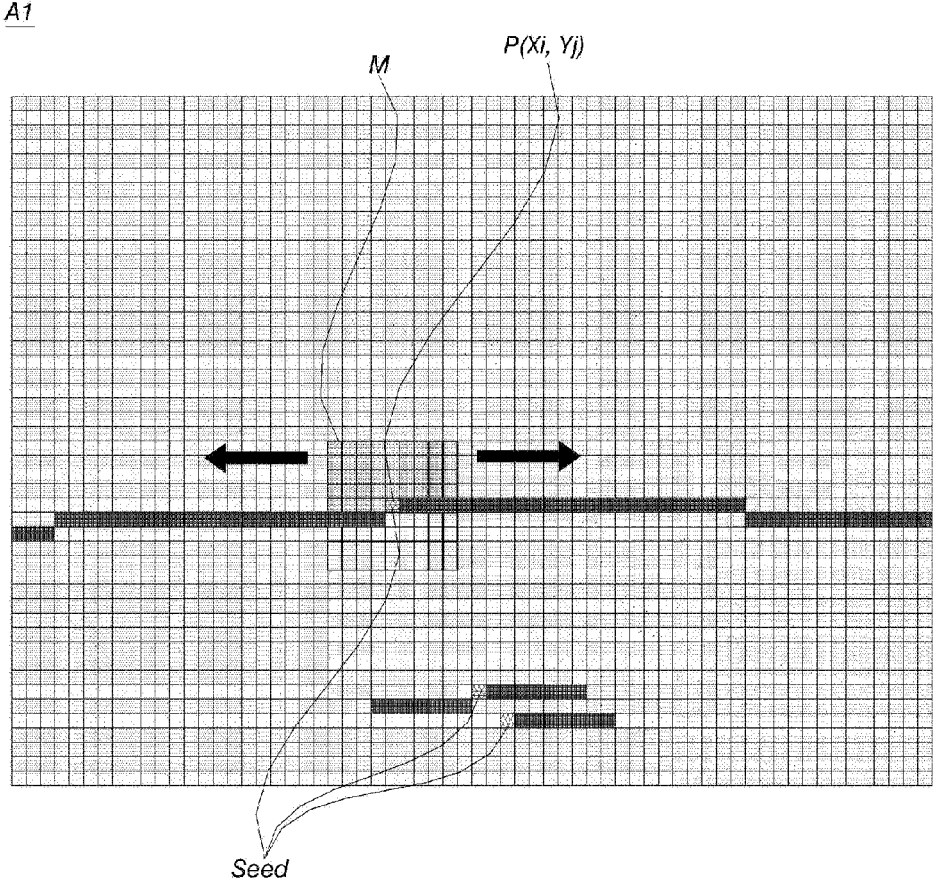
FIG. 9 illustrates an embodiment of detecting a boundary from an acquired image through feature detection using the mask.

As shown in FIG. 9, the present embodiment uses a mask M which takes the form of a 9×9 matrix composed of a pixel P(Xi, Yj) corresponding to a detection target and 80 pixels around the pixel P(Xi, Yj), and is divided into an upper region composed of five upper rows and a lower region composed of four rows. Brightness values of pixels belonging to the upper region are assigned an index of −1 and brightness values of pixels belonging to the lower region are assigned an index of +1.

Application of the mask is defined as calculation of a difference between the brightness (the sum of brightness values of all pixels belonging to the lower region) of the lower region and the brightness (the sum of brightness values of all pixels belonging to the upper region) of the upper region in the 9×9 matrix area having the detection target pixel positioned at the center of the mask M. The brightness difference between the lower region and the upper region is defined as a brightness contrast value.

The boundary detection step S30 (refer to FIG. 6) may include a step S31 of detecting at least one seed pixel, a step S32 of selecting one of the detected seed pixels, and feature detection steps S33 and S36 of selecting a pixel (referred to as "feature point" hereinafter) having the largest brightness contrast value by applying the mask to pixels constituting a column Col which adjoins the selected seed pixel (Xi, Yj).

In the seed pixel detection step S31, at least one pixel more likely to form a boundary is detected. Since a long time and a lot of resources are used to obtain brightness contrast values and to detect a feature point while applying the mask M to pixels from all pixels of an acquired image to neighboring pixels, it is efficient to select a seed pixel and then extend a detection area from the seed pixel to neighboring pixels.

Figure 7:
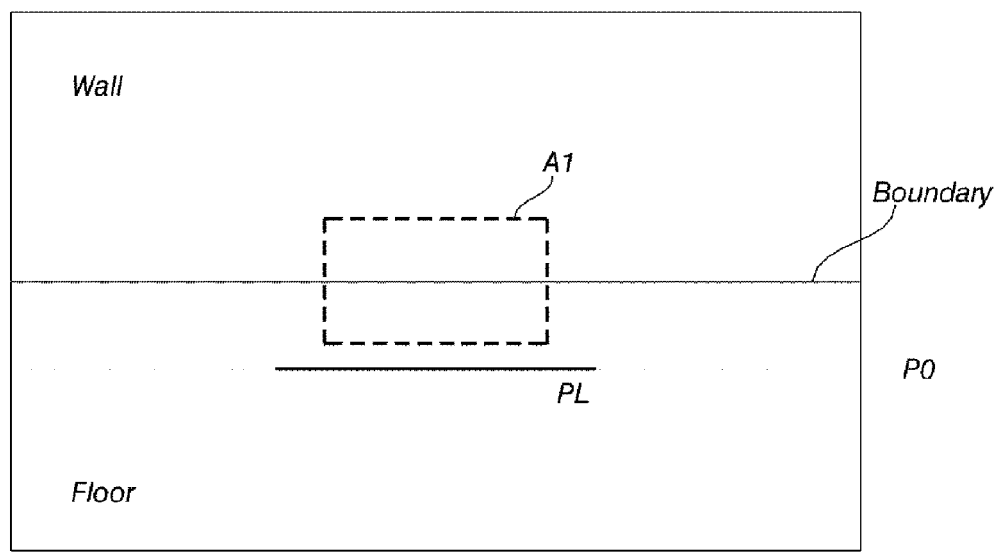
FIG. 7 shows an acquired image in which patterned light projected by a light projection unit and the boundary between a floor and a wall are indicated.
Figure 8:
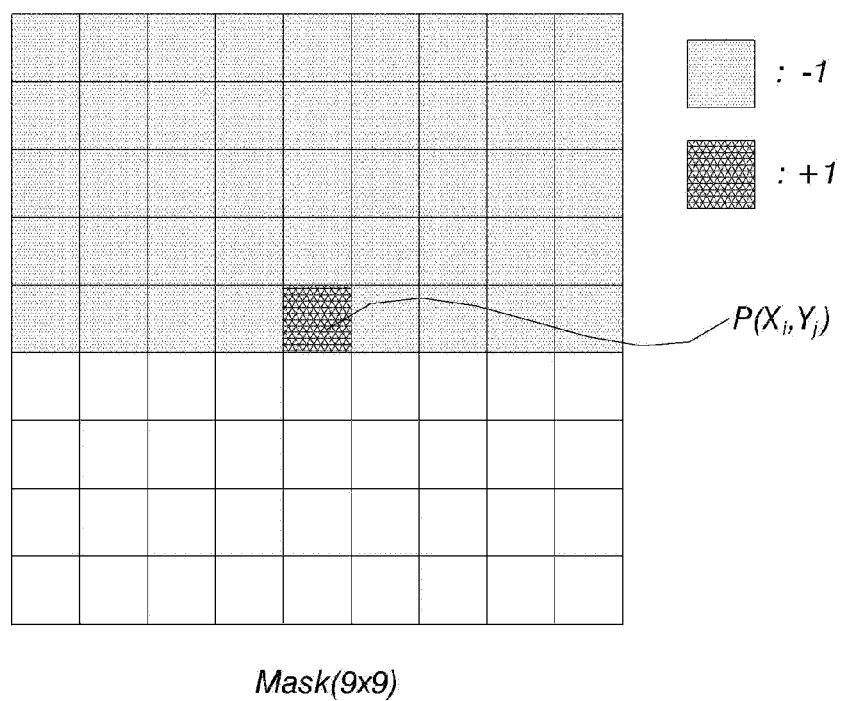
FIG. 8 shows a mask applied during feature detection.

In the seed detection step S31, several pixels having large brightness contrast values can be selected by applying the mask to rows of the acquired image. While the seed detection step S31 may be performed on all pixels of the acquired image, step S31 is performed on a region in which a boundary is more likely to be detected. For example, as shown in FIG. 7, in an acquired image when an obstacle is not present in front of the robot cleaner 100, a pattern PL according to light projected by the light projection unit 150 appears on the floor on which the robot cleaner 100 travels and the boundary between the floor and a wall appears above the pattern PL. In this case, a specific region above the position P0 of a horizontal segment (i.e., pattern PL) appearing in the acquired image can be set as a seed detection area A1.

The pattern detection module 141 detects the pattern PL on the basis of brightnesses of pixels constituting the acquired image, and the boundary detection module 142 performs seed detection on the seed detection area A1 set above the position P0 of the pattern PL when the detected pattern PL corresponds to the pattern according to light projected by the light projection unit 150 (that is, in the case of a horizontal segment).

The seed detection step S31 may include a step of sequentially applying the mask M to pixels of the seed detection area A1 along columns thereof. For example, when the seed detection area A1 is composed of c columns and r rows, a process of sequentially applying the mask M to r pixels constituting the first column and sequentially applying the mask M to r pixels constituting the next column is repeated until all the c columns are searched. Several pixels having large brightness contrast values can be selected as seed pixels by comparing brightness contrast values of pixels, obtained through this process. Alternatively, several pixels, from among the pixels having large brightness contrast values, may be selected as seed pixels.

Referring to FIG. 9, three seeds detected through the seed detection step S31 are shown in the present embodiment. The feature detection steps S33 and S36 for detecting pixels which form a boundary include a step of detecting a pixel having the largest brightness contrast value by applying the mask M to pixels constituting a column which adjoins the seeds. The feature detection steps S33 and S36 can be performed by the boundary detection module 142. Hereinafter, pixel coordinates are indicated on the basis of an m×n acquired image composed of m columns and n rows.

Figure 10:
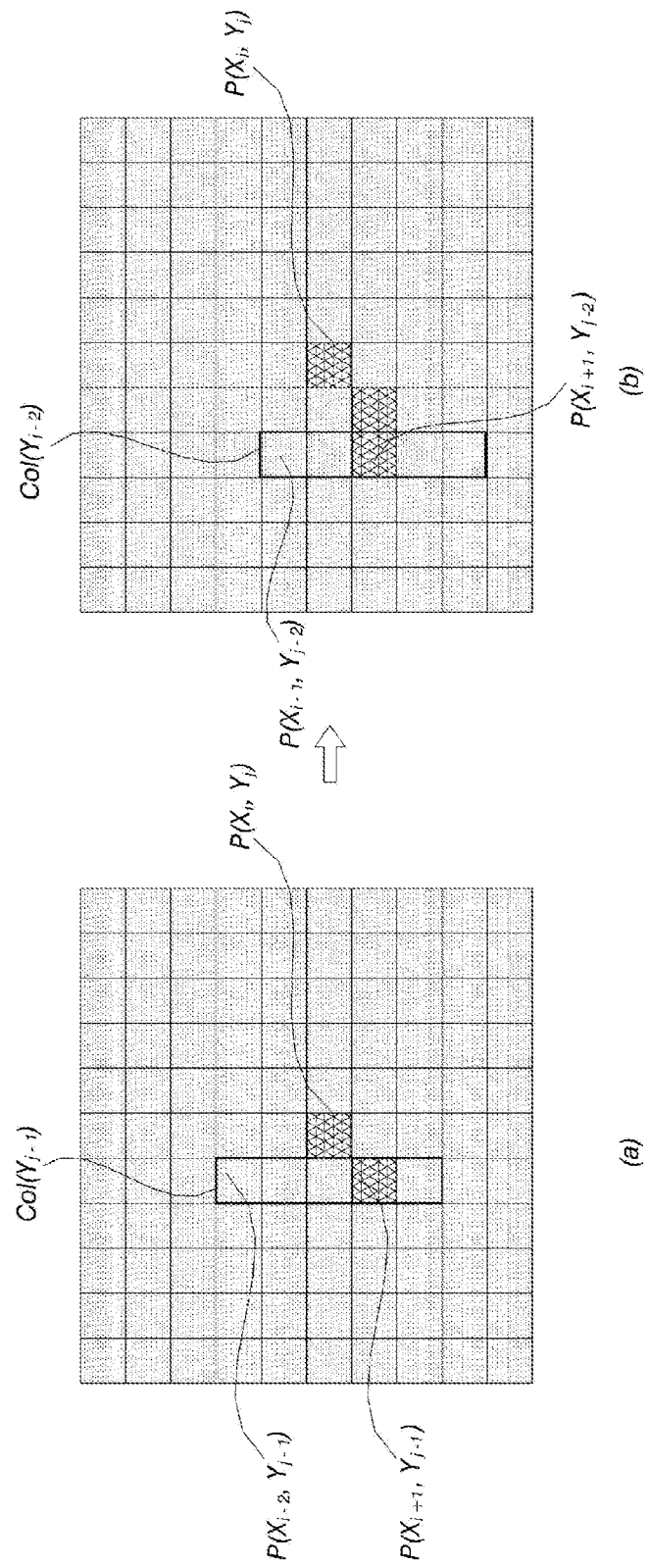
FIG. 10 illustrates a procedure of detecting pixels constituting a boundary through feature detection.

Referring to FIG. 10, the feature detection step S33 includes a step of applying the mask M to a predetermined number of pixels constituting a column Col(Yj−1) which adjoins a seed P(Xi, Yj). The mask M may be applied to all pixels constituting the column Col(Yj−1). However, the boundary to be detected has a strong tendency to be extended in the horizontal direction rather than the vertical direction, and a pixel belonging to a column spaced apart from the seed P(Xi, Yj) has a lower probability that the pixel constitutes the boundary. Accordingly, it is desirable to apply the mask M to pixels which belong to a predetermined number of columns adjoining the seed P(Xi, Yj) and are positioned in the vertical direction.

In the present embodiment, the mask M is applied to five pixels P(Xi−2, Yj−1) to P(Xi+2, Yj−1) from among the pixels constituting the column Col(Yj−1). As can be seen from the figure, the five pixels include a pixel P(Xi, Yj−1) belonging to the same row as the seed P(Xi, Yj), two pixels above the pixel P(Xi, Yj−1) and two pixels below the pixel P(Xi, Yj−1). FIG. 10(a) shows a feature pixel P(Xi+1, Yj−1) detected from the column Col(Yj−1) through the feature detection step S33.

Feature detection is performed on the detected feature pixel P(Xi+1, Yj−1) and a neighboring column Col(Yj−2) (S34, S35 and S33). Feature detection performed on the column Col(Yj−2) is substantially the same as that applied to the column Col(Yj−1). FIG. 10(b) shows a feature pixel P(Xi+1, Yj−2) detected from the column Col(Yj−2). The process of sequentially detecting features from columns can be sequentially performed from the column Col(Yj−1) adjoining the seed to the first column of the acquired image (S34).

While detection of features to the left from the seed P(Xi, Yj) has been described, the present disclosure is not limited thereto and feature detection may be performed to the right from the seed. That is, features on both sides of the seed can be detected. Steps S36 to S38 of FIG. 6 correspond to a process of sequentially performing the feature detection step S36 on columns to the right from the seed P(Xi, Yj) and use the same feature detection principle as steps S32 to S35 while differing from steps S32 to S35 in that features are sequentially detected to the right from the seed. Accordingly, description of the steps S36 to S38 is omitted.

The feature detection steps S33 and S36 can be performed on all seeds. FIG. 9 shows three segments obtained by performing feature detection on three seeds. The boundary detection module 142 can select a boundary from the three segments according to a specific standard. The longest one of the three segments is most likely to correspond to the boundary between the floor and the wall in the acquired image having no obstacle in the present embodiment. In this case, accordingly, the boundary detection module 142 can select the longest segment from the segments detected from the seeds as the boundary between the floor and the wall.

Figure 11:
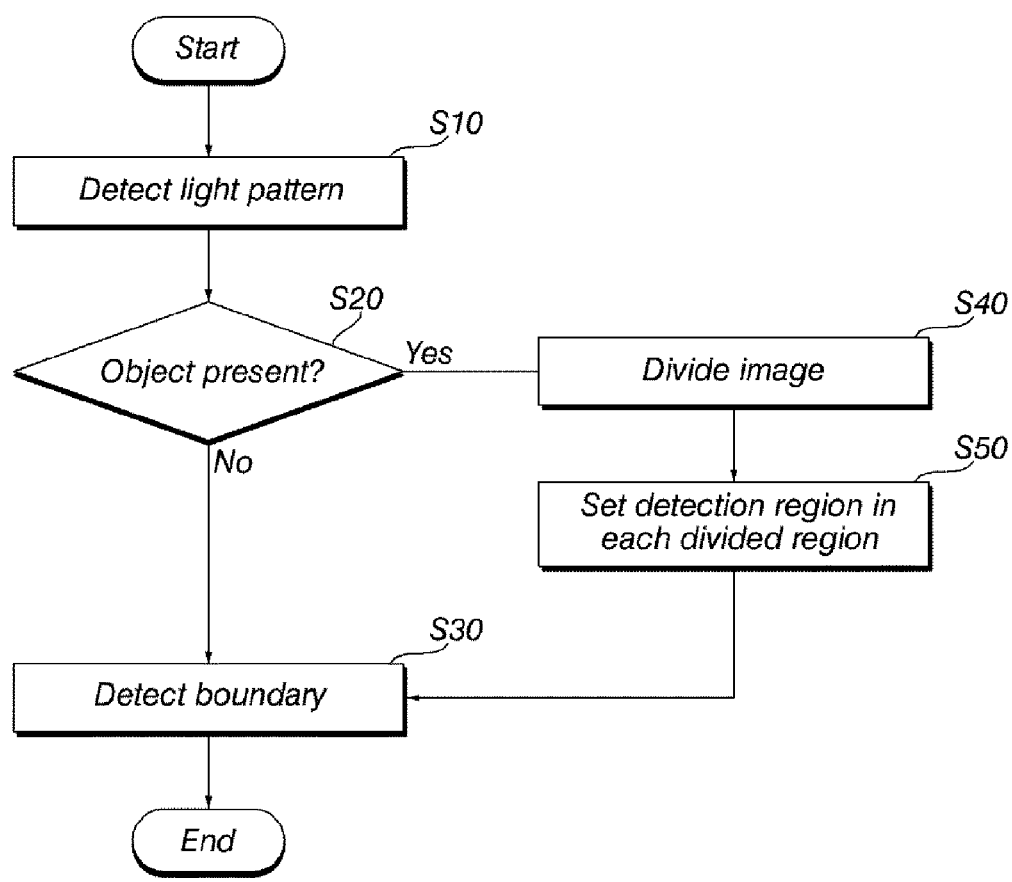
FIG. 11 is a flowchart illustrating a method for controlling the robot cleaner according to another embodiment of the present disclosure.

Referring to FIG. 11, the method for controlling the robot cleaner according to an embodiment of the present disclosure includes a step S10 of detecting a light pattern (indication of patterned light on an acquired image) from the acquired image and a step S20 of determining whether an obstacle is present in the acquired image on the basis of the detected light pattern. When it is determined that no obstacle is present in the acquired image, a feature detection step S30 is performed as in the aforementioned embodiment. When it is determined that an obstacle is present in the acquired image, the acquired image is divided into an obstacle presence region including the obstacle and an obstacle absence region having no obstacle (S40).

Figure 12:
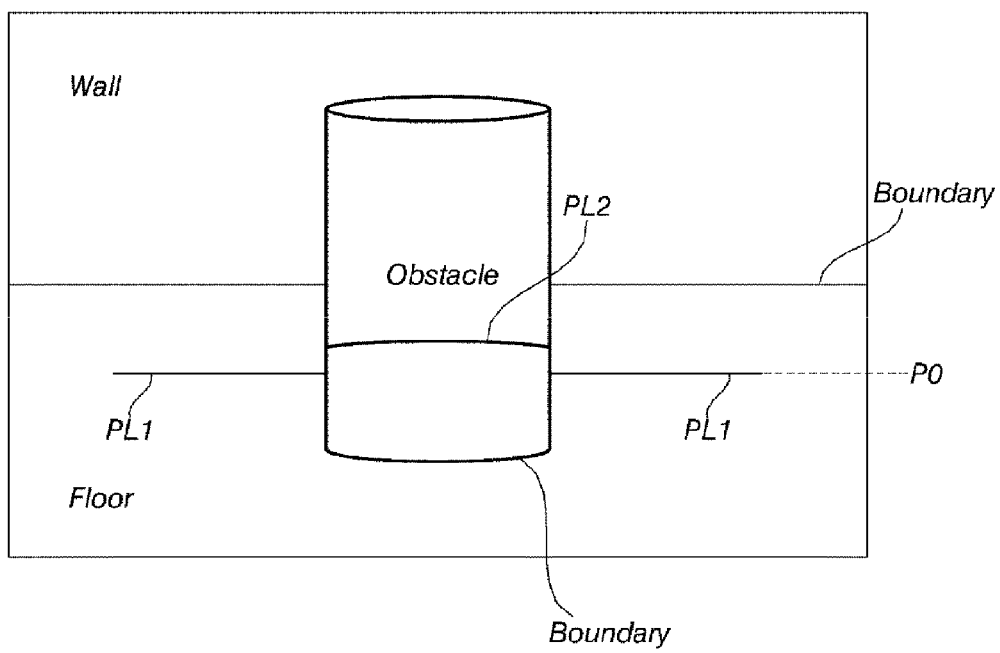
FIG. 12 shows an acquired image when an obstacle is present within a photographing range of an image acquisition unit.

Step S10 of detecting the light pattern can be performed by the pattern detection module 141. In this step, presence or absence of an obstacle within a photographing range (i.e., in front of the robot cleaner 100) can be detected from a change in the form of the patterned light, projected from the light projection unit 150, on the surface of the obstacle. When an obstacle is not present within the photographing range of the image acquisition unit 120, the patterned light is irradiated to the floor and thus a light pattern PL (refer to FIG. 7) of a horizontal segment is detected from the acquired image. When an obstacle is present within the photographing range, a pattern PL2 appears above the position P0 of patterned light PL1 (refer to FIG. 12) irradiated to the floor due to light projected to the surface of the obstacle. Since the pattern appearing in a deformed form due to the obstacle is generally discontinuous at the edge of the obstacle, the pattern detection module 141 may detect presence of the obstacle on the basis of discontinuity of the pattern recognized through the acquired image.

Figure 13:
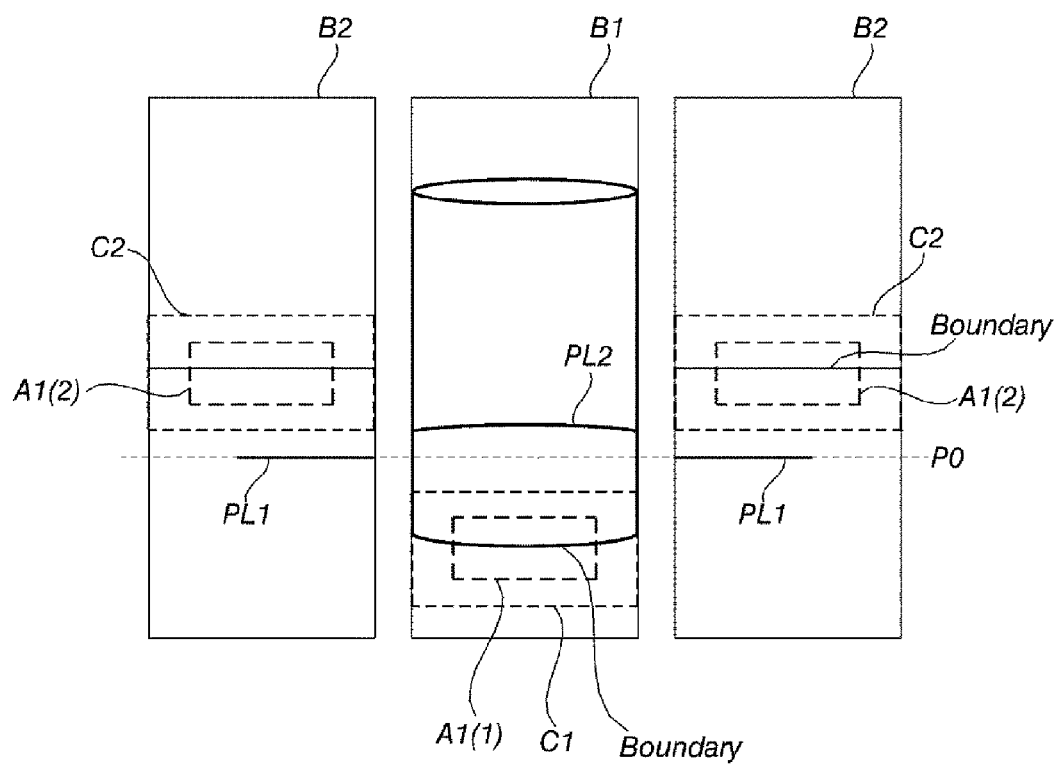
FIG. 13 shows vertical division of the acquired image shown in FIG. 12 into a region including the obstacle and a region having no obstacle.

As shown in FIG. 13, when it is determined that an obstacle is present in the acquired image, the boundary detection module 142 divides the acquired image into an obstacle presence region B1 and an obstacle absence region B2 through vertical segmentation. In the present embodiment, the acquired image is divided into the obstacle presence region B1 and obstacle absence regions B2 positioned at both sides of the obstacle presence region B1.

The boundary detection module 142 sets boundary detection regions in the respective regions B1 and B2 (S50). In the obstacle absence region B2, a boundary detection region C2 is set above the position P0 of the segment PL1 since the boundary between the floor and the wall is detected from an area above the position P0 of the segment PL1. In the obstacle presence region B1, a boundary detection region C1 is set below the position P0 of the segment PL1 since the boundary between the obstacle and the floor is detected from an area below the position P0 of the segment PL1.

The boundary detection module 142 performs feature detection on the boundary detection regions C1 and C2 (S30). The feature detection step S30 according to the present embodiment is substantially the same as the feature detection step described above with reference to FIG. 6 except that feature detection is performed on each boundary detection region. The seed detection area A1 (refer to FIG. 7) may be set in each boundary detection region. In the present embodiment, part A1(1) of the obstacle presence region B1 and part A1(2) of the obstacle absence region B2 are set as seed detection areas.

When the obstacle is present as described above, the acquired image is divided and a boundary detection range is reduced in consideration of characteristics of divided regions (i.e., in consideration of a region expected to be an area from which a boundary will be geometrically detected). Accordingly, it is possible to increase boundary detection speed and to prevent a segment misrecognized as a boundary from being detected from a region although a boundary cannot detected from the region.

The movement control module 143 can control the drive motor 139 such that the robot cleaner 100 can move while avoiding boundaries, on the basis of boundaries detected by the boundary detection module 142.

The robot cleaner and the control method thereof according to the present disclosure can detect a boundary between objects on an image of a cleaning area in front of the robot cleaner. Particularly, the robot cleaner and the control method thereof can eliminate risk of collision between the robot cleaner and a wall or an obstacle by detecting the boundary between the floor and the wall and the boundary between the floor and the obstacle, which obstruct movement of the robot cleaner.

In addition, the robot cleaner and the control method thereof according to the present disclosure can improve boundary detection accuracy and reduce boundary detection time by specifying a boundary detection region depending on obstacles in front of the robot cleaner.

Furthermore, it is possible to obtain more accurate depth information of an image by using both the boundary between objects, confirmed through the image, and information about a light pattern projected by the light projection unit.

Therefore, the present disclosure has been made in view of the above problems, and it is an object of the present disclosure to provide a robot cleaner and a method for controlling the same which are capable of detecting the boundary between objects in a cleaning area from an image.

To accomplish the object of the present disclosure, there is provided a method for controlling a robot cleaner, including: (a) acquiring an image of an area in front of a main body; (b) selecting a seed pixel from the acquired image; (c) obtaining brightness differences between upper regions and lower regions respectively obtained by horizontally dividing predetermined detection areas to which detection target pixels belong, the detection target pixels including pixels belonging to the same low as the seed pixel in a column adjoining the seed pixel, (c) being performed on each of the detection target pixels; and (d) selecting a pixel belonging to a detection area having a largest brightness difference from the detection target pixels as a pixel constituting the boundary between objects indicated in the image.

(b) may include: (b-1) obtaining a brightness difference between an upper region and a lower region obtained by horizontally dividing a predetermined detection area including each of pixels constituting a column in the image; and (b-2) selecting a pixel belonging to a detection area having a largest brightness difference from the pixels constituting the column as the seed pixel.

(b-1) may be performed on two or more columns constituting the image.

The seed pixel may be selected from pixels within a predetermined specific area in the image. The robot cleaner may include a light projection unit for downward projecting patterned light including a horizontal segment to an area in front of the main body, wherein the specific area is defined as a predetermined area above the position of a horizontal segment indicated in the image according to light projected by the light projection unit to a horizontal floor on which the main body is located.

The method may further include vertically dividing the image into an obstacle presence region in which light projected by the light projection unit is indicated above a predetermined reference height and an obstacle absence region in which the light is indicated at the reference height, wherein the specific area is defined as a predetermined region below the reference height in the obstacle presence region and as a predetermined region at the reference height in the obstacle absence region. The predetermined reference height may be a height at which a horizontal segment appears in the image according to light projected by the light projection unit to the horizontal floor on which the main body is located.

The method may further include: detecting a boundary on the basis of pixels selected in (d); and controlling movement of the robot cleaner on the basis of the detected boundary.

To accomplish the object of the present disclosure, there is provided a robot cleaner, including: a movable main body; an image acquisition unit for acquiring an image of an area in front of the main body; and a controller configured to select a seed pixel from the image acquired by the image acquisition unit, to obtain a brightness difference between an upper region and a lower region obtained by horizontally dividing a predetermined detection area to which each of detection target pixels belongs, the detection target pixels including pixels belonging to the same row as the seed pixel in a column adjoining the seed pixel, and to select a pixel belonging to a detection area having a largest brightness difference from the detection target pixels as a pixel constituting the boundary between objects indicated in the image.

For each of pixels constituting a column in the image, the controller may obtain a brightness difference between an upper region and a lower region obtained by horizontally dividing a predetermined detection area including each pixel constituting the column in the image and select a pixel belonging to a detection area having a largest brightness difference from the pixels constituting the column as the seed pixel.

The controller may select the seed pixel in two or more columns constituting the image.

The controller may select the seed pixel from pixels within a predetermined specific area in the image. The robot cleaner may further include a light projection unit for downward projecting patterned light including a horizontal segment to an area in front of the main body, wherein the controller defines a predetermined area above the position of a horizontal segment indicated in the image according to light projected by the light projection unit to a horizontal floor on which the main body is located, as the specific area. The controller may vertically divide the image acquired by the image acquisition unit into an obstacle presence region in which light projected by the light projection unit is indicated above a predetermined reference height and an obstacle absence region in which the light is indicated at the reference height, define a predetermined region below the reference height as the specific area in the obstacle presence region and define a predetermined region at the reference height as the specific area in the obstacle absence region. The predetermined reference height may be a height at which a horizontal segment appears in the image according to light projected by the light projection unit to the horizontal floor on which the main body is located.

The controller may detect a boundary on the basis of the selected pixels and control movement of the robot cleaner on the basis of the detected boundary.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a robot cleaner, comprising:
   (a) acquiring an image of an area in front of a main body;
   (b) selecting a seed pixel from the image acquired in step (a);
   (c) obtaining a brightness difference between an upper region and a lower region obtained by horizontally dividing a predetermined detection area to which each of detection target pixels belongs, the detection target pixels including pixels belonging to the same row as the seed pixel in a column adjoining the seed pixel; and
   (d) selecting a pixel belonging to a detection area having a largest brightness difference from the detection target pixels as a pixel constituting the boundary between objects indicated in the image.

2. The method of claim 1, wherein step (b) comprises:
   (b-1) obtaining a brightness difference between an upper region and a lower region obtained by horizontally dividing a predetermined detection area including each of pixels constituting a column in the image; and
   (b-2) selecting a pixel belonging to a detection area having a largest brightness difference from the pixels constituting the column as the seed pixel.

3. The method of claim 2, wherein step (b-1) is performed on two or more columns constituting the image.

4. The method of claim 1, wherein the seed pixel is selected from pixels within a predetermined specific area in the image.

5. The method of claim 4, wherein the robot cleaner includes a light projection unit for downward projecting patterned light including a horizontal segment to an area in front of the main body,
   wherein the specific area is defined as a predetermined area above the position of a horizontal segment indicated in the image according to light projected by the light projection unit to a horizontal floor on which the main body is located.

6. The method of claim 5, further comprising vertically dividing the image into an obstacle presence region in which light projected by the light projection unit is indicated above a predetermined reference height and an obstacle absence region in which the light is indicated at the reference height,
   wherein the specific area is defined as a predetermined region below the reference height in the obstacle presence region and as a predetermined region at the reference height in the obstacle absence region.

7. The method of claim 6, wherein the predetermined reference height is a height at which a horizontal segment appears in the image according to light projected by the light projection unit to the horizontal floor on which the main body is located.

8. The method of claim 1, further comprising:
   detecting a boundary on the basis of pixels selected in (d); and
   controlling movement of the robot cleaner on the basis of the detected boundary.

9. A robot cleaner, comprising:
   a movable main body;
   an image acquisition unit for acquiring an image of an area in front of the main body; and
   a controller configured to select a seed pixel from the image acquired by the image acquisition unit, to obtain a brightness difference between an upper region and a lower region obtained by horizontally dividing a predetermined detection area to which each of detection target pixels belongs, the detection target pixels including pixels belonging to the same low as the seed pixel in a column adjoining the seed pixel, and to select a pixel belonging to a detection area having a largest brightness difference from the detection target pixels as a pixel constituting the boundary between objects indicated in the image.

10. The robot cleaner of claim 9, wherein, for each of pixels constituting a column in the image, the controller obtains a brightness difference between an upper region and a lower region obtained by horizontally dividing a predetermined detection area including each pixel constituting the column in the image and selects a pixel belonging to a detection area having a largest brightness difference from the pixels constituting the column as the seed pixel.

11. The robot cleaner of claim 9, wherein the controller selects the seed pixel in two or more columns constituting the image.

12. The robot cleaner of claim 9, wherein the controller selects the seed pixel from pixels within a predetermined specific area in the image.

13. The robot cleaner of claim 12, further comprising a light projection unit for downward projecting patterned light including a horizontal segment to an area in front of the main body, wherein the controller defines a predetermined area above the position of a horizontal segment indicated in the image according to light projected by the light projection unit to a horizontal floor on which the main body is located, as the specific area.

14. The robot cleaner of claim 13, wherein the controller vertically divides the image acquired by the image acquisition unit into an obstacle presence region in which light projected by the light projection unit is indicated above a predetermined reference height and an obstacle absence region in which the light is indicated at the reference height, defines a predetermined region below the reference height as the specific area in the obstacle presence region and defines a predetermined region at the reference height as the specific area in the obstacle absence region.

15. The robot cleaner of claim 14, wherein the predetermined reference height is a height at which a horizontal segment appears in the image according to light projected by the light projection unit to the horizontal floor on which the main body is located.

16. The robot cleaner of claim 9, wherein the controller detects a boundary on the basis of the selected pixels and controls movement of the robot cleaner on the basis of the detected boundary.

* * * * *